United States Patent [19]

Janssen et al.

[11] 3,759,465

[45] Sept. 18, 1973

[54] TAPE CONTAINING CASSETTES, EACH WITH A REMOVABLE WALL

[75] Inventors: Donovan M. Janssen, Boulder; Ernest P. Kollar, Broomfield; Eugene G. Stahlberg, Westminster; Hui-li Tiao, Boulder, all of Colo.

[73] Assignee: International Business Machines Corporation, Armonk, N.Y.

[22] Filed: Apr. 23, 1971

[21] Appl. No.: 136,675

[52] U.S. Cl. .......................... 242/199, 179/100.2 Z

[51] Int. Cl. .......................................... G11b 23/10

[58] Field of Search.................... 242/199, 200, 197, 242/198, 180, 181, 182, 183, 184, 185, 71.1, 71.2; 179/100.2 Z; 274/4 B, 4 C, 4 E, 11 B, 11 C; 352/72, 78

[56] References Cited

UNITED STATES PATENTS

| | | | |
|---|---|---|---|
| 3,706,979 | 12/1972 | Tagawa et al. | 274/4 D |
| 1,871,236 | 8/1932 | Proctor | 242/71.2 X |
| 1,904,097 | 4/1933 | Steiner | 242/71.2 UX |
| 2,216,909 | 10/1940 | Foster | 242/197 X |
| 3,008,012 | 11/1961 | Proctor | 242/198 X |
| 3,235,264 | 2/1966 | Mikrut | 242/200 X |

*Primary Examiner*—George F. Mautz
*Attorney*—Hanifin & Jancin and Herbert F. Somermeyer

[57] ABSTRACT

A tape-containing cassette facilitates interchange between low-speed recording systems and high-speed or high-performance recording systems. In a low-performance system, the tape is transported wholly within the cassette. The cassette may be removed from a low-performance player and placed in a high-performance player. Then, the tape is partially removed from the cassette for higher speed transport. A front wall opening of the cassette includes a pair of movable front wall end plates. The end plates partially covering the front wall opening facilitate in-the-cassette tape processing. Moving the two end plates to a nonclosure position clears the entire front wall opening to facilitate removing the tape from the cassette for out-of-the-cassette tape processing.

4 Claims, 5 Drawing Figures

TAPE CONTAINING CASSETTES, EACH WITH A REMOVABLE WALL

RELATED PATENT

Co-filed Patent application Ser. No. 136,674, now U.S. Pat. No. 3,706,979, describes and claims an invention related to the invention described and claimed in the present application.

BACKGROUND OF THE INVENTION

The present invention relates to tape-containing cassettes for use in data processing systems and particularly to those cassettes having upward and downward performance characteristics.

The data processing industry, for years, has used magnetic tape as a memory media. Many tape recording systems use half-inch tape stored on a spool containing 500 to 2,400 feet of such tape. Even though they are usable on drives of various performance, these reels of tape are quite heavy. As such, they do not lend themselves easily to transporting and storage. Also, the cost of the mechanism used to record and reproduce from such tapes is quite expensive. Accordingly, half-inch tape systems have been limited to the more expensive data processing systems and usually have been excluded from those portions of data processing systems utilizing communications networks, such as telephone systems for intercommunications.

In parallel to the growth of the data processing industry, the entertainment field, i.e., audio, video, and the like, has produced tape-containing cassettes or cartridges which are interchangeable among a large plurality of relatively low-speed cassette players. By low-speed is meant less than 50 inches per second of tape transport velocity. Recently, such cassettes and cartridges have been adapted to digital recording. Again, such cassettes have been useful only with relatively low-speed cassette players. Such an arrangement is satisfactory as long as the data transfer rate of the connected systems remains relatively low. However, in a data collection system, this is not always the case; and, therefore, the present digital cassettes and digital cassette players do not meet all of the operational requirements of a large data collection or data processing system.

On the other hand, it has been well known that the use of vacuum buffers and the like are important for transporting webs at high speeds for use in data processing operations. Some systems, such as those shown by Bilsback U.S. Pat. No. 2,941,741, show a cassette having an openable cover for partially removing record tape therefrom for high-speed data processing in a vacuum column type of tape transport. If such a cartridge were used on a low-speed device, the cost of the transport could be unnecessarily high. Therefore, there are conflicting requirements for high-speed transport and low-speed tape transport with respect to tape in a cartridge.

SUMMARY OF THE INVENTION

It is an object of the present invention to provide an improved tape-containing cassette adaptable for both low-speed and high-speed operations and for minimizing cost of the respective cassette players.

A cassette incorporating the teaching of the present invention has an integral tape path along which tape may be transported for transducing operations. The tape path extends along one front longitudinal wall of the cassette with that wall having openings for receiving a magnetic head, pinch roller, and the like, for effecting transducing operations with respect to the tape while being transported within the cassette.

The front wall further is removably disposed such that the whole length of tape extending therealong may be exposed for removal from the cassette for transducing operations external to the cassette. Preferably, the front wall is replaceable.

In a preferred form of the invention, the front wall consists of two separate pieces, one of which is apertured for receiving a pinch roller and closes one end portion of the wall. The other end plate of the front wall may be solid and closes the other end portion of the end wall whereby at least two apertures are formed in the end wall, one for receiving a head which may preferably extend between the ends of the end plates when installed in the cassette and the other being an aperture in one of the end plates. In a specific form of the invention, the end plates are longitudinally slidable into and out of end wall forming positions.

In a second form of the invention, the end plates are hinged at the corners of the cassette for pivoting motion between closing and opening positions with respect to the end wall. Each end plate preferably has an inwardly extending tape retaining guide projection adapted to extend between a pair of flanges on idler rollers rotatably secured in the cartridge. Detent retaining may be provided for the end plates.

The foregoing and other objects, features, and advantages of the invention will be apparent from the following more particular description of the preferred embodiment of the invention, as illustrated in the accompanying drawings.

THE DRAWINGS

FIG. 1 is a simplified diagrammatic showing of an end plate disposed within the cartridge and showing the advantage of the inwardly extending guide projection with respect to the idler spool in the cassette.

DETAILED DESCRIPTION

Figures 1, 2:
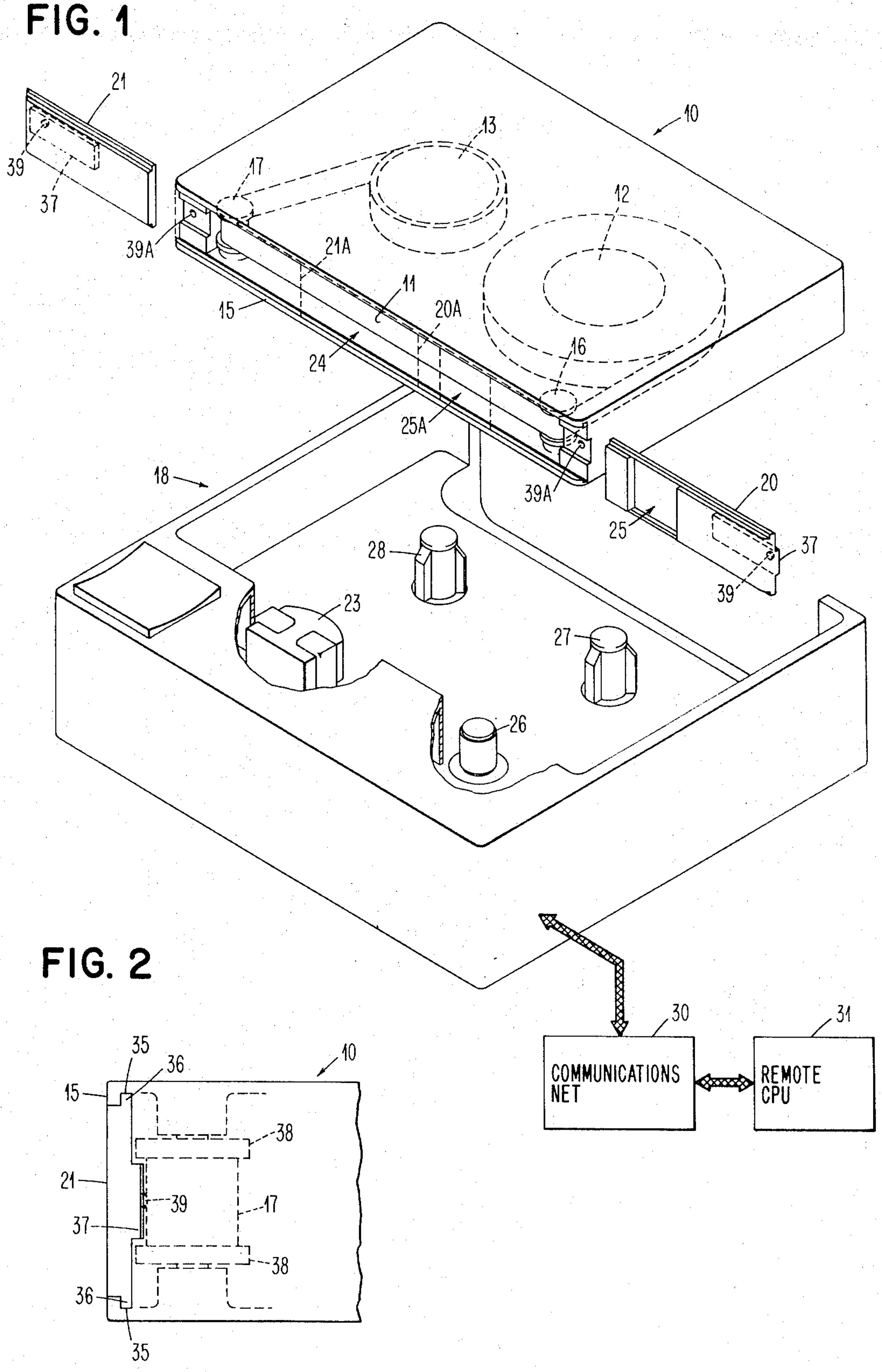
FIG. 1 is a simplified isometric diagrammatic view of a cassette constructed in accordance with the teaching of the present invention and disposed above a cassette player adapted for transducing operations with tape in the cassette and with the end plates removed for illustrating the relationships thereof to the cassette.
FIG. 2 is a simplified diagrammatic showing of an end plate disposed within the cartridge and showing the advantage of the inwardly extending guide projection with respect to the idler spool in the cassette.

Referring now more particularly to the drawings, like numerals indicate like parts and structural features. Cassette or cartridge 10 contains tape 11 wound on a pair of spools 12 and 13. Along front end wall portion 15 of cassette 10, tape 11 is movingly disposed between a pair of flanged idler rollers 16 and 17. When cassette 10 is used in low-speed cassette player 18, the pair of end plates 20 and 21 partially close front end wall portion 15 as shown by dotted lines 20A and 21A. When cassette 10 is used in player 40 of FIG. 3, end plates 20 and 21 are removed for exposing tape 11 along front wall portion 15. Detent cavities 39 in end plates 20, 21 respectively cooperate with detents 39A on cassette 10 to releasably hold the end plates in a front wall partially covering the position indicated by dashed lines 20A and 21A.

End plates 20 and 21 in the closed dotted line position protect tape 11 from snagging and tearing during insertion and ejection from player 18. End plates 20 and 21 are spaced apart to form transducer 23 receiving aperture 24 such that transducer operations can be effected on tape 11 in cassette 10. Aperture 25, shown in operating position at 25A, receives a pinch roller in player 18 (not shown) which presses tape 11 against a continuously rotating capstan 26. Capstan 26 is insertable into cassette 10 through an aperture (not shown) in a lower broadside wall. Player 18 has a pair of reel drive spindles 27 and 28 engagable with reels 12 and 13 for rotating same in a known manner.

As shown in FIG. 1, player 18 is a communications terminal for communications net 30 connected to remote central processing unit (CPU) 31. Net 30 permits only a relatively slow data rate; therefore, player 18 transports tape 11 at a relatively low velocity past transducer 23 in coordinated relationship with data signals exchanged via communication net 30.

The relationship of end plates 20 and 21 to the cassette is best seen by inspection of FIG. 2, which is illustrated for end plate 21. Front wall portion 15 of cassette 10 has a pair of facing grooves 35 for slidably receiving outwardly extending shoulders 36 on end plate 21. In the center portion of plate 21, depending tape guide projection 37 extends between the outer peripheral extent of the flanges 38 on idler roller 17. Tape 11 moves between projection 37, flanges 38, and the hub portion of idler 17. It has been found that without such a physical constraint, during rapid acceleration or deceleration, tape 11 could form an additional undesirable loop within the cassette and possibly damage the tape. The construction with respect to plate 20 and idler 16 is the same as that shown for plate 21 in FIG. 2.

Figures 3, 4, 5:
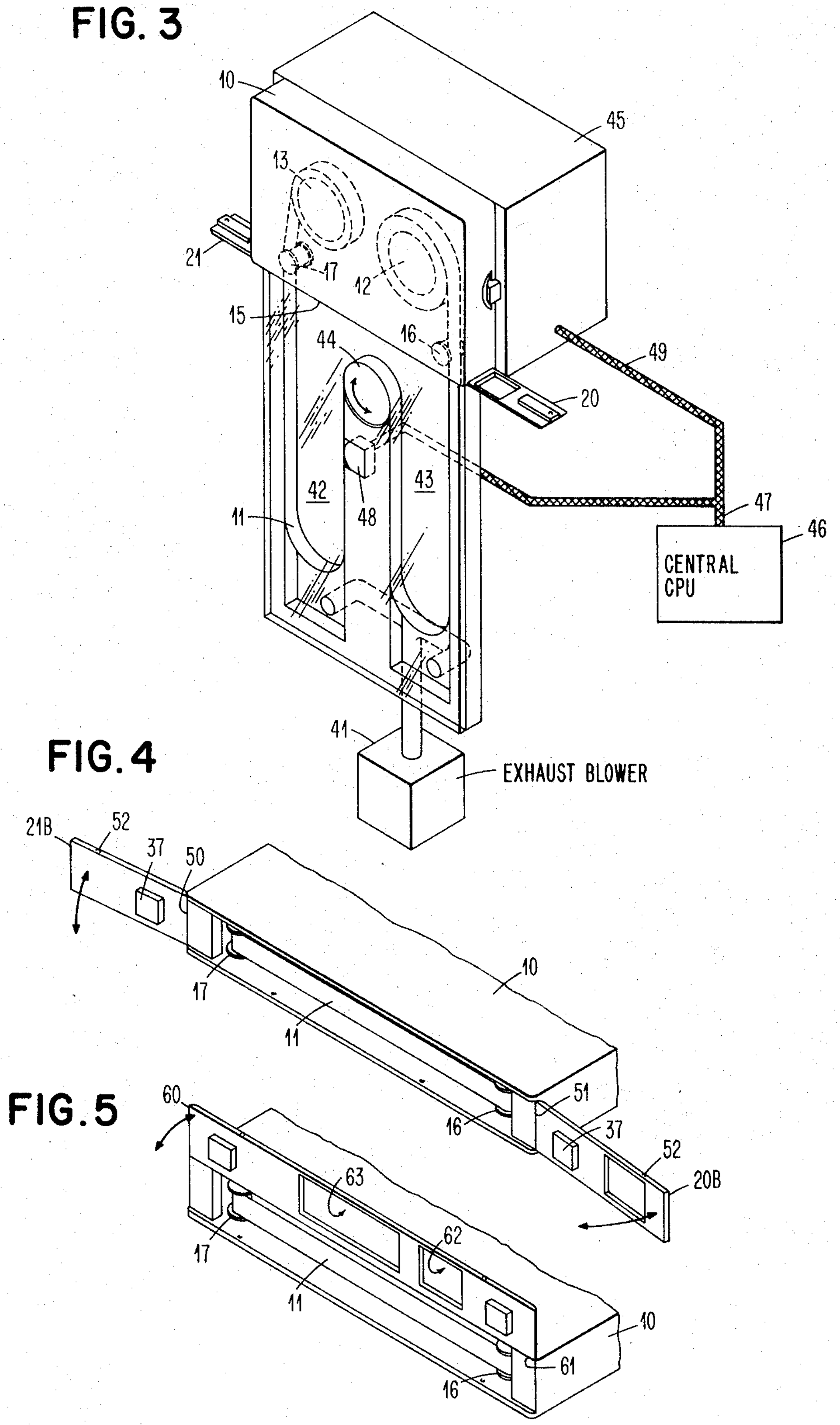
FIG. 3 is a diagrammatic showing of a data processing system utilizing the illustrated cassette with a vacuum column type of tape buffer transport.
FIG. 4 is a diagrammatic showing of a modification of the FIG. 1 cassette in that the end plates are hinged at the cassette corners for pivoting motion between closing and opening positions.
FIG. 5 is a cassette with the front wall hinged along one longitudinal edge of the cassette.

Cassette 10 is also used in high-speed transport 40 (FIG. 3). Transport 40 has a mechanism (not shown) for retracting end plates 20 and 21 through the illustrated position beyond the outer extent of the tape path defined by idlers 16 and 17. Tape 11 is then fully exposed along front end wall portion 15 and may be partially withdrawn from cassette 10 through vacuum urging of exhaust blower 41. A pair of vacuum bins or columns 42 and 43 receive the withdrawn portion to facilitate out-of-the-cassette transducing operations. Such a partial unloading of the tape from the cassette is taught by R. A. Barbeau in the IBM TECHNICAL DISCLOSURE BULLETIN article entitled "Automatic Tape Loading and Unloading" in Volume 4, Number 12, dated May 1962, on pages 31 and 32, and is also referred to in the Bilsback patent, supra. For this reason, the loading and unloading of tape 11 to and from cassette 10 is not further described.

Transport 40 has single capstan 44 for transporting tape between vacuum columns 42 and 43. Tape transport control 45 includes a pair of reel drive motors (not shown) and associated control circuits for selectively rotating reels 12 and 13 in coordinated action with capstan 44 as is well known in the tape transport art. Central CPU 46 has data signal exchanging cable 47 connected to transducer or head 48 disposed between vacuum columns 42 and 43. Control signals are exchanged between control 45 and CPU 46 over cable 49. Operation of transport 40 is not further described as it follows known data processing techniques.

Tape transport 18 and tape transport 40 can be located within the same room for facilitating exchanging cassette 10 therebetween. For example, a portion of the room may be assigned as a communications terminal. Player 18 is located within the terminal; and through either a stacker or other form of automatic library systems, many of which are known, one or more cassettes 10 may be used to exchange data signals with remote CPU 31. Upon completion of the data exchange, the cassettes are removed from the communication terminal portion and taken over to the data processing portion at transport 40. A library system, such as described in the Burke et al, U.S. Pat. Nos. 2,941,738 and 2,941,739, may be used for loading and unloading cassette 10 in transport 40. Alternatively, manual loading and unloading may be used. Also, a common library system may be used for connecting the communication terminal cassette player 18 to transport 40, the cassettes being automatically loaded and unloaded from the various cassette players of differing performance in accordance with instructions from central CPU 46. In that instance, end plates 20 and 21 and the associated apparatus should be fully automatically operated. Details of such automatic operation can take several known forms.

FIG. 4 shows a second embodiment of cassette 10 wherein end plates 20B and 21B are hingedly secured at corners 50 and 51 of cassette 10. Idler rollers 16 and 17 are constructed identically with inwardly extending tape guide projection 37 being formed on the inner side of the hinged end plates 21B and 20B. A set of detents 52 are inwardly formed in the outer end portions of the hinged end plates.

FIG. 5 shows a third cassette front wall arrangement. Cassette 10 has tape 11 threaded over idlers 16 and 17 as previously described. Front wall 60 is hinged to cassette 10 along front upper edge 61 for pivoting between closed (in-the-cassette tape handling) and open (out-of-cassette tape handling), as shown. The hinge can be integrally formed in wall 60 and cassette 10 or may be a metal hinge riveted, bolted, or molded in place to wall 60 and cassette 10. Suitable detents ensure that front wall 60 is retained in the closed position. Front wall 60 has apertures 62 and 63 for respectively receiving a pinch roller and head for in-the-cassette transducing operations.

Other movable front walls may have different aperture configurations to accommodate various transparent design choices. Additionally, other techniques of releasably retaining front wall 60 may be used.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A tape containing cassette for operation with a tape-cassette player adapted to perform transducing operations on a tape while transported within the cassette and also operable with a second player which is adapted to perform transducing operations on the tape when partially removed from said cassette, said cassette having an open front wall portion extending between two opposite longitudinal end walls with a pair of tape guides at opposite ends of said front wall portion for defining a tape path therebetween extending along the front wall portion, the improvement including:

a pair of end plates, means mounting said end plates for slidable engagement with said front wall portion for closing opposite end portions of the end wall portion and leaving a tape access aperture therebetween and completely removable for permitting said tape to pass said guides in a path somewhat parallel to said opposite longitudinal end walls for facilitating high-speed tape transport.

2. The cassette set forth in claim 1 wherein said end plates, when partially closing said end wall portion, include a tape path controlling projection extending in cooperative relationship with said guides whereby said tape, when transported in the cassette, is restricted to a predetermined tape path.

3. A tape-containing cassette having a pair of spools rotatably secured therein and having tape extending therebetween along a path adjacent opposite longitudinal end walls, past a pair of tape path controlling guides, thence along one end wall portion, said one end wall portion being open, a removable closure consisting of two removable end plates disposed along said one end wall portion and partially covering opposite end portions thereof for forming a tape access aperture along said tape path of size smaller than said one end wall portion and between said removable end plates, and means on said closure cooperating with said guides in said cassette for forming a tape path in a restricted manner for limiting looping of the tape within the cassette during transport.

4. The cassette set forth in claim 3 wherein said tape path controlling guides include a pair of flanged idler wheels disposed at opposite ends of said one end wall portion, and said means on said closure including a pair of inward tape guiding projections on said closure extending between the flanges respectively on said guides.

* * * * *

PO-1050
(5/69)

UNITED STATES PATENT OFFICE
CERTIFICATE OF CORRECTION

Patent No. 3,759,465 Dated September 18, 1973

Inventor(s) Donovan M. janssen, Ernest P. Kollar, Eugene G. Stahlberg, and Hui-Li Tiao It is certified that error appears in the above-identified patent and that said Letters Patent are hereby corrected as shown below:

Column 2, delete lines 44 through 47.

Column 4, line 57, change "movable" to --removable--.

Signed and sealed this 26th day of February 1974.

(SEAL)
Attest:

EDWARD M.FLETCHER,JR.
Attesting Officer

C. MARSHALL DANN
Commissioner of Patents

121